United States Patent
Rugg

(10) Patent No.: US 9,994,142 B2
(45) Date of Patent: Jun. 12, 2018

(54) PERSONAL ELECTRIC VEHICLE MOUNT

(71) Applicant: Universal City Studios LLC, Universal City, CA (US)

(72) Inventor: John Rugg, Los Angeles, CA (US)

(73) Assignee: UNIVERSAL CITY STUDIOS LLC, Universal City, CA (US)

( * ) Notice: Subject to any disclaimer, the term of this patent is extended or adjusted under 35 U.S.C. 154(b) by 27 days.

(21) Appl. No.: 15/203,789

(22) Filed: Jul. 6, 2016

(65) Prior Publication Data

US 2018/0009364 A1  Jan. 11, 2018

(51) Int. Cl.
| | |
|---|---|
| *B60P 7/15* | (2006.01) |
| *B60P 3/073* | (2006.01) |
| *B60P 7/08* | (2006.01) |
| *B60P 3/079* | (2006.01) |
| *B60P 3/077* | (2006.01) |

(52) U.S. Cl.
CPC .............. *B60P 7/15* (2013.01); *B60P 3/073* (2013.01); *B60P 3/077* (2013.01); *B60P 3/079* (2013.01); *B60P 7/0823* (2013.01)

(58) Field of Classification Search
CPC ........... B60P 3/075; B60P 3/073; B60P 3/079; B60P 3/077; B60P 3/07; B60P 3/122; B60P 7/0807; B60P 7/0869
USPC ...... 410/3, 7, 23, 19, 30, 97, 120, 46, 67, 8, 410/9, 96; 280/656, 412, 204, 400, 280/411.1, 748; 296/20, 35.3
See application file for complete search history.

(56) References Cited

U.S. PATENT DOCUMENTS

| | | | |
|---|---|---|---|
| 4,611,961 A * | 9/1986 | Van Iperen | B60P 3/075 248/499 |
| 7,395,625 B2 | 7/2008 | Chladny | |
| 7,959,388 B2 * | 6/2011 | Van Keeken | B60P 3/075 410/10 |
| 8,172,492 B1 * | 5/2012 | Kelderman | B60P 3/079 410/23 |
| 8,327,979 B2 | 12/2012 | Lynch et al. | |
| 8,602,699 B1 * | 12/2013 | Dickson | B60P 3/073 410/3 |
| 2003/0165376 A1 * | 9/2003 | Bruno | A61G 3/0209 414/462 |

* cited by examiner

*Primary Examiner* — D Glenn Dayoan
*Assistant Examiner* — Sunsurraye Westbrook
(74) *Attorney, Agent, or Firm* — Fletcher Yoder P.C.

(57) ABSTRACT

An apparatus for an amusement park includes a mounting device for use in a transportation vehicle in the amusement park, wherein the mounting device is configured to retain a personal electric vehicle (PEV). The apparatus for the amusement park also includes a base assembly of the mounting device configured to secure the mounting device to a floor of the transportation vehicle. The apparatus for the amusement park further includes an arm of the mounting device including a first portion and a second portion, wherein the first portion of the arm is pivotally coupled to the base assembly via a hinge assembly and the second portion of the arm is coupled to a retaining assembly of the mounting device configured to retain the PEV, and wherein the first portion and the second portion are coupled to one another at a joint.

20 Claims, 7 Drawing Sheets

PERSONAL ELECTRIC VEHICLE MOUNT

FIELD OF DISCLOSURE

The present disclosure relates generally to the field of amusement parks. More specifically, embodiments of the present disclosure relate to systems and methods utilized to secure and transport personal electric vehicles on transportation vehicles in the amusement park.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks often include attractions throughout a large area of the amusement park. Accordingly, there are transportation vehicles (e.g., tram, bus, or shuttle) running within the amusement park to pick up and/or drop off passengers to different areas, attractions, and designated stops or stations. Some of the passengers may use a personal vehicle (e.g., bicycle or wheelchair) while at the amusement park. Accordingly, transportation vehicles often include mounting structures (e.g., a bicycle rack) to receive and secure the personal vehicles, such that passengers may get on the transportation vehicles with their personal vehicles. However, as the personal vehicles develop and evolve, traditional mounting structures may not be suitable or compatible with the newer types of personal vehicles. It is now recognized that it is desirable to provide systems and methods for mounting or securing certain newer types of personal vehicles to provide convenience for the passengers.

BRIEF DESCRIPTION

Certain embodiments commensurate in scope with the originally claimed subject matter are summarized below. These embodiments are not intended to limit the scope of the disclosure. Indeed, the present disclosure may encompass a variety of forms that may be similar to or different from the embodiments set forth below.

In accordance with one aspect of the present disclosure, an apparatus for an amusement park includes a mounting device for use in a transportation vehicle in the amusement park, wherein the mounting device is configured to retain a personal electric vehicle (PEV). The apparatus for the amusement park also includes a base assembly of the mounting device configured to secure the mounting device to a floor of the transportation vehicle. The apparatus for the amusement park further includes an arm of the mounting device including a first portion and a second portion, wherein the first portion of the arm is pivotally coupled to the base assembly via a hinge assembly and the second portion of the arm is coupled to a retaining assembly of the mounting device configured to retain the PEV, and wherein the first portion and the second portion are coupled to one another at a joint.

In accordance with another aspect of the present disclosure, a transportation system for an amusement park includes a transportation vehicle comprising a floor having a stationary rail and configured to carry passengers between locations associated with the amusement park. The transportation vehicle for the amusement park also includes a mounting device configured to retain a personal electric vehicle (PEV) on the floor of the transportation vehicle. The mounting device includes a base assembly of the mounting device securing the mounting device to the floor of the transportation vehicle via the stationary rail. The mounting device also includes an arm of the mounting device including a first portion and a second portion, wherein the first portion of the arm is pivotally coupled to the base assembly via a hinge assembly, and the second portion of the arm is coupled to a retaining assembly of the mounting device configured to retain the PEV, and wherein the first portion and the second portion are coupled to one another at a joint.

In accordance with another aspect of the present disclosure, a method for retaining a personal electric vehicle (PEV) using a mounting device includes rotating an arm of the mounting device in a first rotational direction to transform the mounting device from a stowed position to a deployed position in which the mounting device is configured to retain the PEV, wherein the arm of the mounting device comprises a first portion and a second portion, wherein the first portion is pivotally coupled to a base assembly of the mounting device via a hinge assembly enabling rotation, and the second portion is coupled to a retaining assembly of the mounting device configured to retain the PEV. The method also includes positioning the PEV adjacent to the mounting device such that an elongated body of the PEV is adjacent the mounting device. The method further includes retaining the PEV via one or more fastener straps of the retaining assembly configured to loop around a portion of the elongated body of the PEV, wherein the elongated body of the PEV extends in a longitudinal direction from between a pair of wheels and to a handle of the PEV.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, to the extent that certain terms such as parallel, perpendicular, and so forth are used herein, it should be understood that these terms allow for certain deviations from a strict mathematical definition, for example to allow for deviations associated with manufacturing imperfections and associated tolerances.

Figure 1:
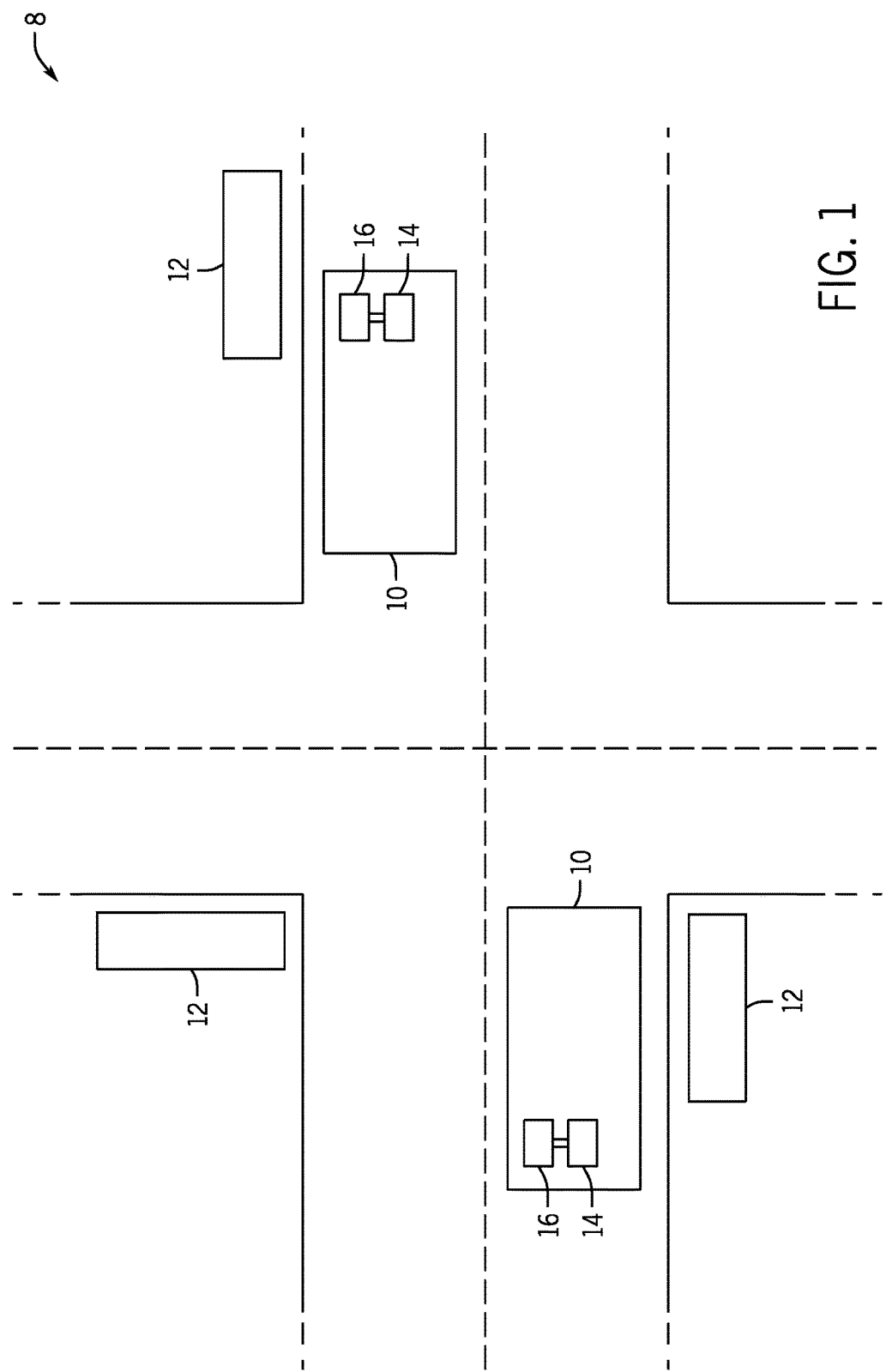
FIG. 1 is a schematic diagram of the transportation vehicles having a mounting device for a personal electric vehicle in an amusement park, in accordance with an aspect of the present disclosure.

To demonstrate various aspects of the present disclosure, the present embodiments are described with respect to transportation vehicles (e.g., a tram, bus, or shuttle) that transport guests and personnel inside an amusement park or from one resort to another. Specifically, embodiments of the present disclosure present a solution for transporting passengers traveling together with their personal electric vehicles. To help illustrate, FIG. 1 is a schematic diagram of transportation vehicles in an amusement park, in accordance with an aspect of the present disclosure. As depicted, a transportation vehicle 10 (e.g., a tram, bus, or shuttle) travels through different areas, attractions or resorts inside an amusement park and stops at a plurality of stations 12 to pick up and drop off passengers. In some instances, some of the passengers may have a personal electric vehicle (PEV) 14. As an example, and the PEVs 14 may include a two-wheeled, self-balancing, battery-powered electric vehicle (e.g., SEGWAY® personal transporter). To accommodate such PEVs 14, the transportation vehicle 10 may include one or more mounting devices 16, each configured to mount or secure one of the PEVs 14 inside the transportation vehicle 10 (e.g., on the floor of the transportation vehicle 10). Further, in certain embodiments, the one or more mounting devices 16 may be transitioned between a stowed position and a deployed position. For example, the stowed position may be a folded configuration of the mounting device 16, while the deployed position may be an unfolded configuration of the mounting device 16.

Figure 2:
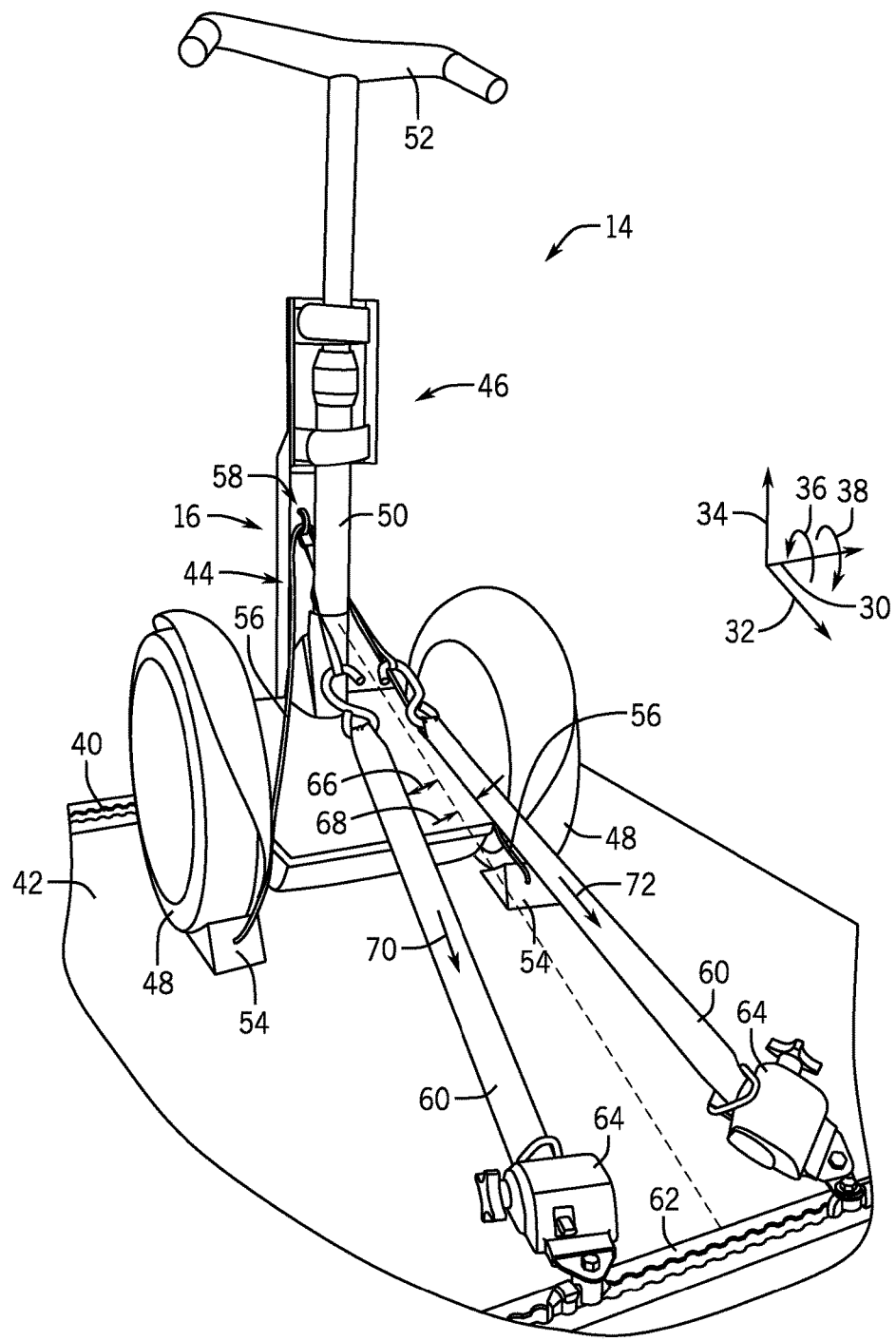
FIG. 2 is a perspective view of an embodiment of a mounting device in a deployed position to secure a personal electric vehicle, in accordance with an aspect of the present disclosure.

An embodiment of the mounting device 16 in a deployed position and securing the PEV 14 is shown in FIG. 2. As shown, the mounting device 16 may be described with reference to a longitudinal axis or x-direction 30, a lateral axis or y-direction 32, a vertical axis or z-direction 34, a first rotational direction 36, and a second rotational direction 38. In the illustrated embodiment, the mounting device 16 of the PEV 14 is mounted onto a first stationary rail or track 40 fixed (e.g., welded or bolted) to a floor 42 of the transportation vehicle 10. For example, the first stationary rail 40 may be fixed to and embedded in the floor 42 of the transportation vehicle 10 in order to lie flush with the floor 42. The first stationary rail 40 may be similar to rails often used in the floor structure for mounting passenger seats or wheelchairs in a bus, train, airplane, and so forth. When the mounting device 16 is in the deployed position as shown, an arm or a body 44 of the mounting device 16 extends upwardly (e.g., in the z-direction 34) in approximately a 90-degree angle relative to the floor 42, and a retaining assembly 46 of the mounting device 16 retains the PEV 14. For simplicity, the PEV 14 is described herein as including a pair of wheels 48, and a body 50 extending between the pair of wheels 48 and a handle 52. As illustrated, the PEV 14 is in an upright position when mounted against the mounting device 16. The PEV 14 is facing the mounting device 16 (e.g., a forward direction of the PEV 14 is oriented toward the mounting device 16), while the mounting device 16 is substantially centered between the pair of wheels 48. The body 50 of the PEV 14 is aligned substantially parallel to the arm 44 of the mounting device 16, and a portion of the body 50 is directly retained by the retaining assembly 46 of the mounting device 16. It may be appreciated that the arm 44 may have any suitable length that enables the PEV 14 to be retained by the retaining assembly 46 below the handle 52 and around the body 50.

It may be appreciated that when there is no PEV 14 to be transported or carried by the transportation vehicle 10, the mounting device 16 may be adjusted from the deployed position shown in FIG. 2 into a stowed or retracted position such that the mounting device 16 essentially lays parallel to the floor 42 of the transportation vehicle 10. For example, an operator may adjust the mounting device 16 to pivot in the second rotational direction 38 to fold the mounting device 16 to its stowed position. When needed for securing the PEV 14, an operator may adjust the mounting device 16 to pivot in the first direction 36 to unfold the mounting device 16 to its deployed position. It may also be appreciated that there may be one or more mounting devices 16 affixed to the first stationary rail 40 spaced along an appropriate distance such that multiple PEVs 14 may be carried and secured within the transportation vehicle 10. In addition, since the mounting device 16 may be removably coupled (e.g., bolted) to the floor 42 of the transportation vehicle 10, the mounting device 16 may be folded and stowed in a location different from its original mounting location (e.g., available locations along the first stationary rail or track 40 or on the floor 42 of the transportation vehicle 10) so as to allow utilization of the space for other features, such as wheelchairs or other transportation devices. In other words, the location in the transportation vehicle 10 where the mounting device 16 is deployed may not necessarily be the same location where the mounting device 16 is stowed.

In addition, the mounting device 16 may be used with other features configured to retain or secure the PEV 14 and support the mounting device 16. A pair of wedge members 54 may be secured to the mounting device 16 and to each other by a string 56 that connects the pair of wedge members 54 to the arm 44 of the mounting device 16 such that the pair of wedge members 54 do not run loose. For example, the ends of the string 56 are connected to the wedge members 54 while the centered portion is hooked around the arm 44 at a suitable affixing feature 58 (e.g., a semicircle connector or the like protruding out of the arm 44).

Further, while the PEV 14 is mounted on the mounting device 16, a pair of straps 60 may also be used to further secure the support for the mounting device 16 and/or the PEV 14. Accordingly, there may be a second stationary rail or track 62 fixed to the floor 42 in the same manner as described above with respect to the first stationary rail 40. The second stationary rail 62 may be substantially parallel to the first stationary rail 40 and on the opposite side relative to the mounting device 16. When the mounting device 16 is in its deployed position, first ends of the pair of straps 60 are connected (e.g., hooked or tied) to the arm 44 of the mounting device 16 (e.g., at the affixing feature 58) while second ends are connected to the second stationary rail 62 via a pair of connectors 64 such that the pair of the straps 60 extend between the arm 44 of the mounting device 16 and the second stationary rail 62 to form angles 66 and 68. It may be appreciated that when PEV 14 is mounted on the mounting device 16, it is in a power-off mode. Without an activated self-balancing mechanism, the PEV 14 may tend to lean forward against the mounting device 16 (e.g., towards the arm 44) and thereby exerts a force on the mounting device 16 (e.g., opposite to the y-direction 32). The pair of straps 60 may retain the PEV 14, and under tension indicated by arrows 70 and 72, to counter at least a portion of the force exerted on the mounting device 16 by the PEV 14.

Furthermore, since the pair of straps 60 may be applied in a substantially symmetrical manner on both sides of the PEV 14 (e.g., the angles 66 and 68 are substantially the same), the tension forces 70 and 72 exerted by the pair of straps 60 may also be substantially symmetrical relative to the mounting device 16, which may help to maintain the mounting device 16 in its deployed position. In addition, the connectors 64 are configured to lock the pair of straps 60 at any positions along the second stationary rail 62, and by adjusting the relative positions of the connectors 64 with respect to each other and to the mounting device 16, the angles 66 and 68 may be varied as to adjust the tension forces 70 and 72 exerted on the mounting device 16. For example, greater angles 66 and 68 (e.g., the connectors 64 are farther apart from each other) may correspond to greater tension forces 70 and 72 while smaller angles 66 and 68 may correspond to smaller tension forces 70 and 72.

Figure 3:
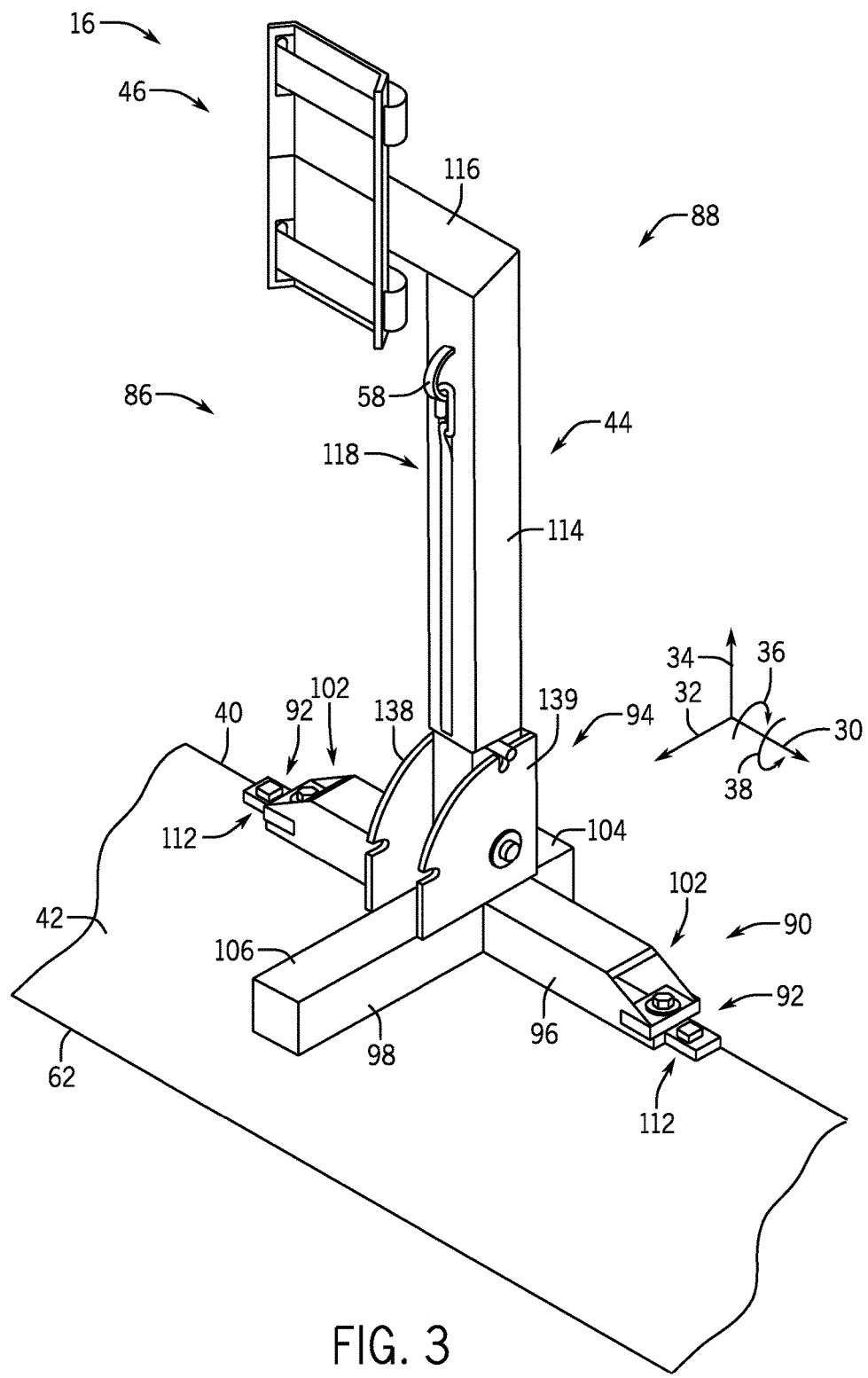
FIG. 3 is a perspective view of the mounting device of FIG. 2, in accordance with an aspect of the present disclosure.

Further details of the mounting device 16 may be appreciated with respect to FIG. 3, which is a perspective view of an embodiment of the mounting device 16. The mounting device 16 has a first or front side 86 that faces the y-direction 32, and the PEV 14 is configured to be mounted on the first side 86. The mounting device 16 also has a second or back side 88 that faces away from the PEV 14 (e.g., opposite to the y-direction 32). The illustrated mounting device 16 includes a base assembly 90, the retaining assembly 46, and the arm 44 extending between the base assembly 90 and the retaining assembly 46. Generally the base assembly 90 is configured to be secured to the first stationary rail 40 via an affixing assembly 92. One end of the arm 44 is pivotally coupled to the base assembly 90 via a hinge assembly 94, while the other end of the arm 44 is connected to the retaining assembly 46. In the illustrated embodiment, the base assembly 90 includes a first bar 96 and a second bar 98, each having a substantially square cross section such that a bottom surface 100 of the base assembly 90 lays flat on the floor 42. The first bar 96 of the base assembly 90 is configured to rest on top of the first stationary rail 40 (see FIG. 2), with ends 102 of the first bar 96 being configured to couple with the first stationary rail 40 via the affixing assembly 92. The second bar 98 of the base assembly 90 perpendicularly bisects the first bar 96 with a first portion 104 on the second side 88 of the mounting device 16, a second portion 106 on the first side 86 of the mounting device 16, and the second portion 106 is longer than the first portion 104. As may be appreciated, the first and second bars 96 and 98 can be hollow bars, solid bars, or portions of the first and/or second bars 96, 98 may be hollow while other portions may be solid. The second portion 106 of the second bar 98 may be longer than the first portion 104 so as to provide more support on the first side 86, which is when the PEV 14 mounts to the mounting device 16.

The affixing assembly 92 is configured to mount the base assembly 90 onto the first stationary rail 40 such that the position of the mounting device 16 may be adjustable along the length of the rail 40. For example, the affixing assembly 92 may include adjustable locks 112 on both ends 102 of the first bar 96 to bolt down (e.g., via bolt, nut and flat washer) the base assembly 90. As a further example, the first stationary rail 40 may include multiple receiving recesses along the longitudinal direction to receive the adjustable locks 112 such that the mounting assembly 16 may be affixed to any available sites by locking down the adjustable locks 112 to the corresponding recesses.

The hinge assembly 94 is disposed on top (e.g., in the z-direction 34) of the base assembly 90 where the first and second bars 96, 98 intersect one another. The arm or body 44 of the mounting device 16 is pivotally coupled to the base assembly 90 via the hinge assembly 94, which allows the arm 44 to rotate in the first direction 36, unfolding the mounting device 16 into the deployed position, and in the second direction 38, folding the mounting device 16 into the stowed position as will be discussed in more detail with respect to FIG. 4.

While the arm 44 may generally have any suitable cross-sectional geometry (e.g., polygonal, or round), in the illustrated embodiment, the arm 44 has a generally square cross-section. The arm 44 may include a first portion 114, a second portion 116, and a biasing assembly 118. The affixing features 58 (e.g., a semicircle connector or the like) may be positioned on both the first and second sides 86 and 88. The first portion 114 of the arm 44 is configured to couple to the base assembly 116 via the hinge assembly 94, while the second portion 116 of the arm 44 is configured to couple to the retaining assembly 46. The biasing assembly 118 is configured to bias the mounting device 16 toward the floor 42. For example, the biasing assembly 118 may be an assembly under tension (e.g., spring biased). As discussed above with respect to FIG. 2, the affixing features 58 are configured to allow coupling of the wedge members 54 and the straps 60 to the mounting device 16, and in addition, the affixing features 58 are also configured to allow coupling of certain features of the biasing assembly 118 to the arm 44 (e.g., via a hook, lock, or tie).

Figure 4:
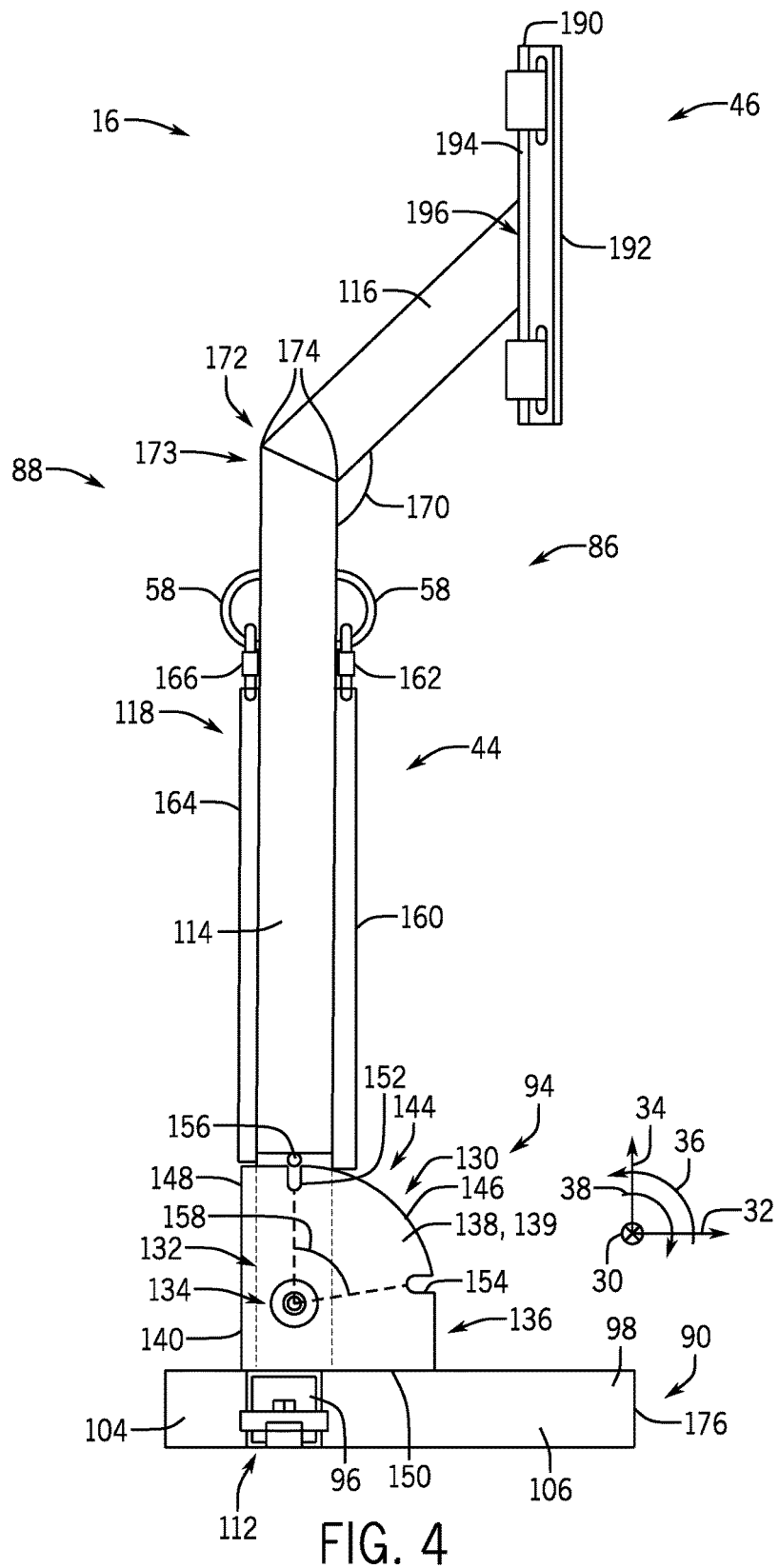
FIG. 4 is a side elevation view of the mounting device of FIG. 2, in accordance with an aspect of the present disclosure.

FIG. 4 is a side view of the mounting device 16 of FIG. 3. Note that since the features illustrated in FIG. 4 are identical on both sides (e.g., facing and opposing the x-direction 30), discussion of one side is sufficient to represent both sides. As illustrated, the hinge assembly 94 includes a bracket 130, a coupling assembly 132, and a shaft assembly 134. The coupling assembly 132 is configured to couple to the arm 44 and to rotate or pivot with the arm 44, as will be discussed below. The bracket 130 includes a frame 136 that is configured to enclose three sides of the coupling assembly 132. For example, the frame 136 has a first face 138 and a second face 139 (see FIG. 3 for 139), each aligned parallel and/or adjacent to the coupling assembly 132 in the +/− x-direction 30, and a third face 140 aligned parallel and/or adjacent to the coupling assembly 132 in the −y-direction 32. It may be appreciated that since the bracket 130 encloses the coupling assembly 132 in all three lateral directions except for the direction designed for the arm 44 to pivot into the stowed position (e.g., along rotational direction 38), the bracket 130 may also serve as a mechanical stop to block the pivoting movement of the arm 44 beyond a certain angle relative to the base assembly 94 in the first rotational direction 36.

While the first and second faces 138, 139 each may generally have any suitable geometry or shape (e.g., triangle, square, round, or polygonal), in the illustrated embodiment, the first and second faces 138, 139 each has a generally quarter circle shape. The first and second faces 138, 139 of the frame 136 each generally has a shape of a quarter circle 144 having a perimeter 146, a first edge 148, and a second edge 150, wherein the first edge 148 meets the third face 140 of the bracket 130 along the z-direction 34, and the second edge 150 meets the second bar 98 of the base assembly 90 along they-direction 32. In addition, the first and second faces 138, 139 of the frame 136 include first notches or recesses 152 and second notches or recesses 154 on the perimeter 146, each configured to receive a pin 156 protruding out of the arm 44 in the +/− x-direction 30. For example, the first and second notches 152 and 154 may have a depth that is the same or slightly greater than the characteristic width of the pin 156. While the first notches 152 are directly above the shaft assembly 134 in the z-direction 34, the second notches 154 are slightly above the second bar 98 of the base assembly 90 such that in the illustrated side view of FIG. 4, the first and second notches 152 and 154 span a pivoting angle 158 with respect to the shaft assembly 134. The pivoting angle 158 may vary between about 90 degrees and about 30 degrees or between about 70 degrees and about 110 degrees. Accordingly, when the mounting device 16 is deployed, the arm 44 (and the coupling assembly 132) pivots relative to the bracket 130 in the first rotational direction 36 until the pin 156 is received by the first notches 152 to lock the arm 44 in the deployed position. Contrarily, when the mounting device 16 is to be stowed, the arm 44 pivots relative to the bracket 130 in the second rotational direction 38 until the pin 156 is received by the second notches 154 to lock the arm 44 in the stowed position. In some embodiments, the first/second faces 138 of the frame 136 may have a shape other than a quarter circle 144, such as a triangle (e.g., a straight line between the first and second notches 152 and 154), or a square with rounded, or chamfered edges between the first and second notches 152 and 154.

Turning now to the coupling assembly 132 of the hinge assembly 94, as discussed above, the coupling assembly 132 rotates or pivots together with the arm 44. In one example, the coupling assembly 132 is configured to couple the arm 44 to the hinge assembly 94 about the shaft assembly 134 and to provide a retaining force (e.g., spring tension) to pull or retain the arm 44 toward the shaft assembly 134. The coupling assembly 132 may include a spring, a piston or any similar biasing mechanism. A displaceable part (e.g., spring, piston) of the coupling assembly 132 may be fixedly coupled to the first portion 114 of the arm 44, such that the arm 44 may be pulled away from the connecting shaft assembly 134 (e.g., when the net pulling force overcomes the tension force of the coupling assembly 132) to allow the mounting device 16 to be adjusted between the deployed and stowed positions. The coupling assembly 132 and the arm 44 are configured to rotate together about the shaft assembly 134 in the first rotational direction 36 or in the second rotational direction 38 while the arm 44 is constantly retained under the tension force of the coupling assembly 132 (e.g., spring tension pulling the arm 44 towards the shaft assembly 134).

Figure 5:
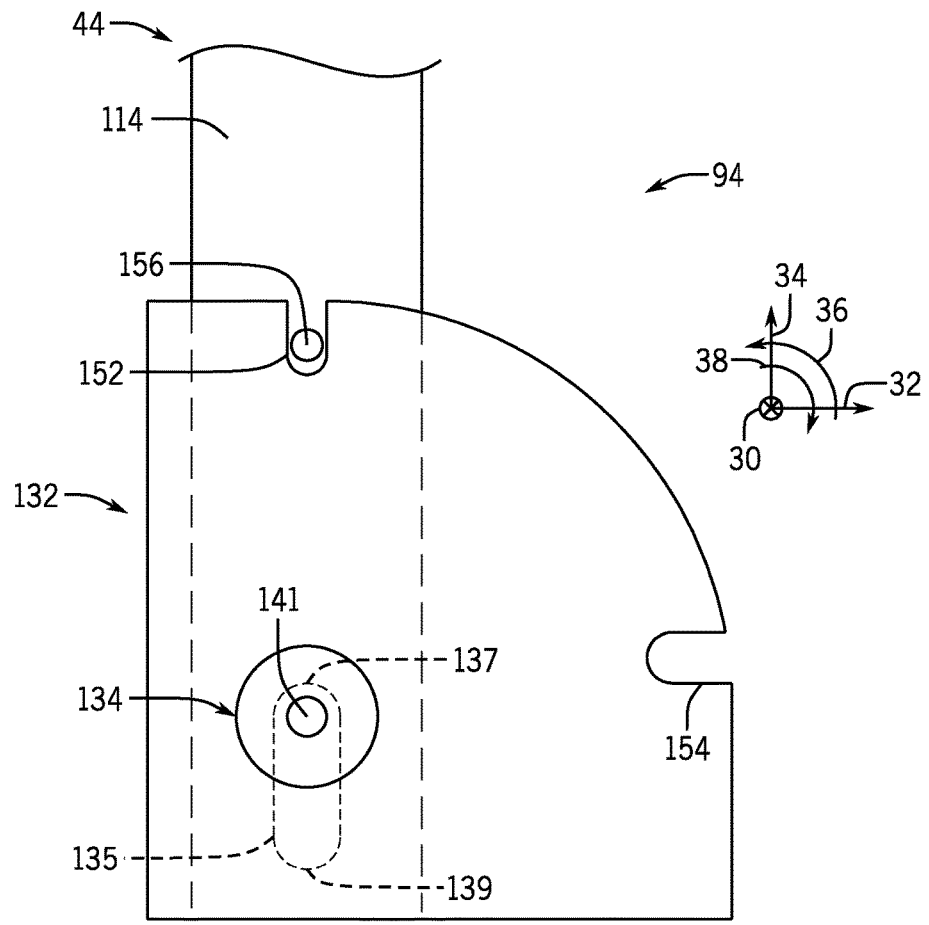
FIG. 5 is a partial cutaway side view of the mounting device of FIG. 2, in accordance with an aspect of the present disclosure.

In another example, the coupling assembly 132 may couple the first portion 114 of the arm 44 to the shaft assembly 134 via an elongated slot as illustrated in FIG. 5, which shows a partial cutaway side view of the hinge assembly 94. The coupling assembly 132 may include one or more elongated slots 135. The slot 135 has two ends 137 and 139, and the longitudinal length (e.g., between the ends 137 and 139) of the elongated slot 135 may be aligned in parallel with the longitudinal direction of the arm 44. The arm 44 may be slideably and rotatably coupled to the shaft assembly 134 via the elongated slot 135. More specifically, an axle 141 of the shaft assembly 134 may extend through the slot 135 (e.g., in the x-direction 30) such that the arm 44 may slide or move relative to axle 141 while the movement is confined by the dimension of the elongated slot 135 (e.g., between the two ends 137 and 139). Such freedom of movement allows the pin 156 to be slide in and out of the notches 152 and 154, and the arm 44 to be rotated in the rotational directions 36 and 38.

To adjust the mounting device 16 from the stowed position to the deployed position, an operator may pull the arm 44 in a direction tangent to the shaft assembly 134 and the second notches 154 such that the pin 156 is pulled out of the second notches 154, rotate the arm 44 in the first rotational direction 36, and slide the pin 156 into the first notches 152 (e.g., the arm 44 is always under a retaining force of the spring assembly 132) to lock the mounting device 16 into the deployed position. As a further example, to adjust the mounting device 16 from the deployed position to the stowed position, an operator may pull the arm 44 in a direction tangent to the shaft assembly 134 and the first notches 152 such that the pin 156 is pulled out of the first notches 152, rotate the arm 44 in the second rotational direction 38, and slide the pin 156 into the second notches 154 to lock the mounting device 16 into the deployed position.

It may be appreciated that in addition to the spring assembly 132 discussed above, the mounting device 16 is also under another biasing force from the biasing assembly 118. As briefly mentioned, the biasing assembly 118 is configured to bias the mounting device 16 toward to the floor 42 (e.g., opposite to the z-direction 34) when in the deployed position. As illustrated, the biasing assembly 118 includes a first strap 160 and a first lock 162 on the first side 86, and a second strap 164 and a second lock 166 on the second side 88. On the first side 86, one end of the first strap 160 is removably coupled (e.g., toollessly removable without breaking or using any specialized tool) to the affixing feature 58 via the first lock 162 while the other end of the first strap 160 is fixedly coupled to the spring assembly 132 of the hinge assembly 94. Symmetrically, on the second side 88, one end of the second strap 164 is removably coupled to the affixing feature 58 via the second lock 166 while the other end of the second strap 164 is fixedly coupled to the spring assembly 132 of the hinge assembly 94. It may be appreciated that the first and second straps 160 and 164 are under tension (e.g., from the plastic nature of the straps) so as to retain the arm 44 and the retaining assembly 46 toward the base assembly 90 with spring tension forces. It may also be appreciated that since the biasing assembly 118 includes similar features on both the first and second sides 86 and 88, the biasing assembly 118 is able to bias the mounting assembly 16 toward the base assembly 90 (e.g., toward the floor 42 in the −z-direction 34) with symmetrical forces on both sides and thereby maintain the mounting assembly 16 upright while in the deployed position.

Furthermore, as illustrated there may be an angle 170 between the first portion 114 and the second portion 116 of the arm 44 such that the arm 44 extends outwardly in the y-direction 32 and couples to the retaining assembly 46. Specifically the arm 44 transitions from the first portion 114 into the second portion 116 around a transition portion 172 with transition portion edges 174. The transition portion edges 174 may be relatively blunt (e.g., having a radius of curvature) or relatively sharp (e.g., little to no curvature). In the illustrated embodiment, the angle 170 is greater than a certain value such that in the deployed position, the retaining assembly 46 is above (e.g., in the z-direction 34) the transition portion 172. In addition, the combination of the angle 170 and the length of the first portion 114 of the arm 44 may be such that the retaining assembly 46 does not exceed a front edge 176 of the base assembly 90 in the y-direction 32, but allows sufficient room to retain the PEV 14 in a secure manner without causing abutment of the PEV 14 against the first portion 114 of the arm 44. In some embodiments, the angle 170 may be between about 120 degrees and about 90 degrees, or about 90 degrees and about 180 degrees.

In some embodiments, the second portion 116 of the arm 44 may be removably (e.g., removable without breaking or using any specialized tool) and/or rotatably (e.g., hingedly) coupled to the first portion 114 of the arm 44 at a joint 173. The joint 173 may include any suitable mechanism to allow detachment or removal of the second portion 116 from the first portion 114, or to allow movement of one portion relative to another. As such, the second portion 116 and the retaining assembly 46 connected thereto may be removed or detached from the first portion 114 of the arm 44. In addition, the joint 173 may include any suitable mechanism to allow rotation or other movement of the second portion 116 in the first rotational direction 36 or the second rotational direction 38. For example, the joint 173 may include mechanisms similar to the coupling assembly 132 as discussed above (e.g., in FIG. 5). As such, the second portion 116 and the retaining assembly 46 connected thereto may be rotated to change the angle 170 in the first rotational direction 36 or the second rotational direction 38 (e.g., to accommodate and secure the PEV 14 of different shapes and sizes).

The retaining assembly 46 includes a frame 190 that has a first face 192 on the first side 86 and a second face 194 on the second side 88. The second portion 116 of the arm 44 is fixedly coupled (e.g., via welding or fastening) to a connecting portion 196 of the retaining assembly 46 on the second face 194, although certain coupling features may extend through to the first face 192 as well. The manner in which the second portion 116 of the arm 44 is coupled to the second face 194 of the retaining assembly 46 may be further appreciated with reference to FIG. 6, which is a back view of the mounting device 16 of FIG. 3. The connecting portion 196 may be located at a substantially centered position on the second face 194 (e.g., substantially equal distances to the edges of the retaining assembly 46 in the x-direction 30 and the z-direction 34), or any other suitable position of the second face 194.

Figure 6:
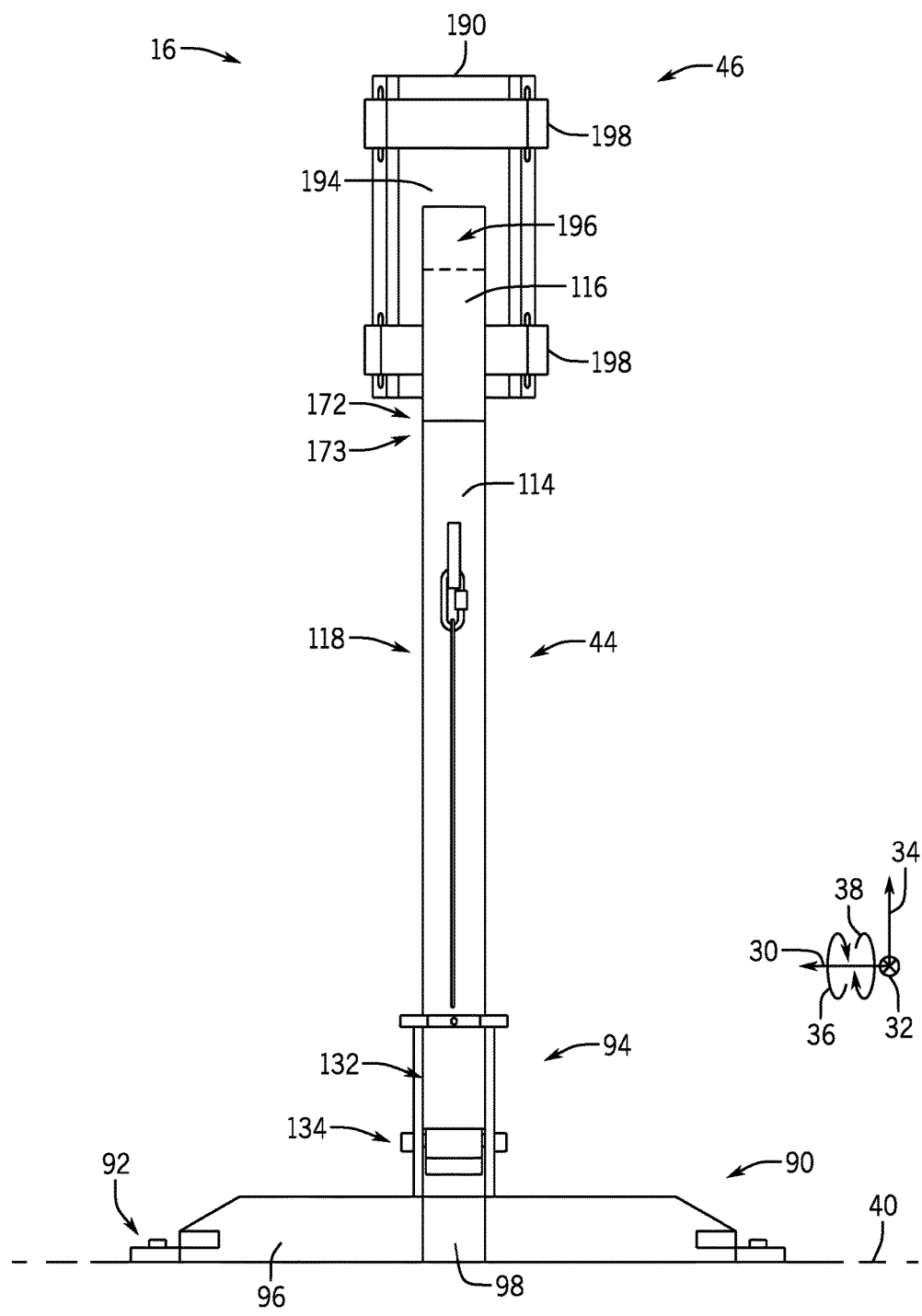
FIG. 6 is a back elevation view of the mounting device of FIG. 2, in accordance with an aspect of the present disclosure.
Figure 7:
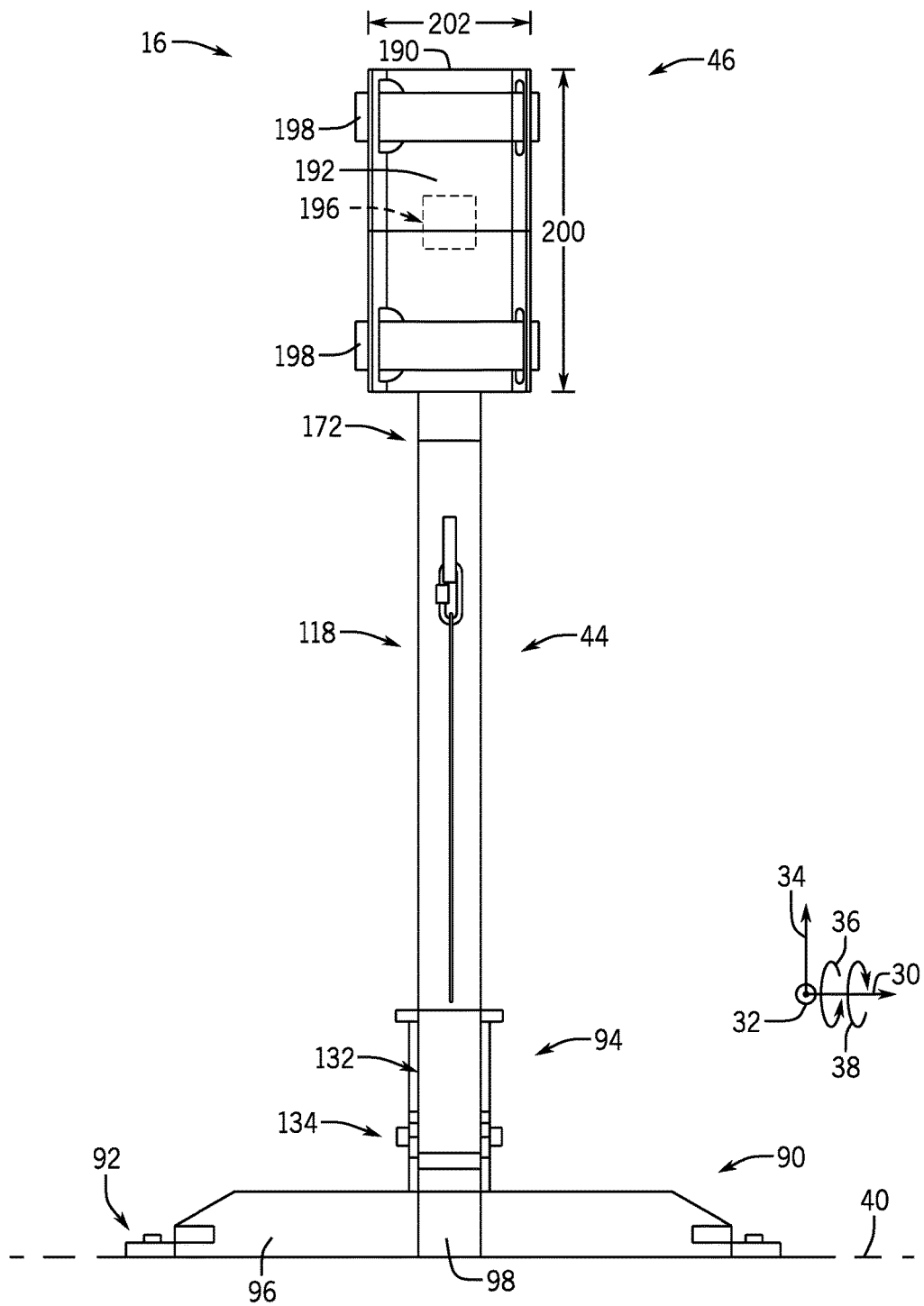
FIG. 7 is a front elevation view of the mounting device of FIG. 2, in accordance with an aspect of the present disclosure.

As shown in FIG. 6 and also the front view of FIG. 7, the retaining assembly 46 further includes fastener straps that each include a closure mechanism. While any closure mechanism may be used, such as hook-and-eye closures, friction-based closures, loop closures, buttons, and similar fastening mechanisms, the illustrated fastener straps 198 each includes hook and loop fasteners (e.g., VELCRO® hook and loop fasteners). As shown, the fastener straps 198 that may be removably coupled to the frame 190 of the retaining assembly 46 and loop around the first and second faces 192 and 194. While the frame 190 of the retaining assembly 196 may generally have any suitable geometry or shape (e.g., square, rectangular, polygonal, round, or elliptical), in the illustrated embodiment, the frame 190 has a generally rectangular shape. The frame 190 of the retaining assembly 196 may have a generally rectangular shape with a length 200 along the z-direction 34 and a width 202 along the x-direction 30, and the length 200 is longer than the width 202. Each of the pair of hook and loop fasteners 198 extends parallel to the width 202. In practice, when the PEV 14 is mounted on the mounting device 16, the body 50 of the PEV 14 may lean against the frame 190 of the retaining assembly 46 while the pair of hook and loop fasteners 198 may wrap around the body 50 so as to secure the PEV 14 in its upright position (see FIG. 2). It may be appreciated that although the illustrated embodiment depicts the retaining assembly 46, only including one pair of the hook and loop fasteners 198, there may be any suitable number (e.g., one, two, three, or more) of the hook and loop fasteners 198 included in the retaining assembly 46. Furthermore, it may also be appreciated that the hook and loop fasteners 198 may be replaceable (e.g., replaced with new hook and loop fasteners). Still in some other embodiments, the retaining assembly 46 may include other suitable retaining mechanisms (e.g., strap, tape, or padded foam to compress the PEV 14 in place) to secure the body 50 of the PEV 14 against the frame 190 of the retaining assembly 46.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An apparatus for an amusement park, comprising:
a mounting device for use in a transportation vehicle in the amusement park, wherein the mounting device is configured to retain a personal electric vehicle (PEV);
a base assembly of the mounting device configured to secure the mounting device to a floor of the transportation vehicle;
an arm of the mounting device including a first portion and a second portion, wherein the first portion of the arm is pivotally coupled to the base assembly via a hinge assembly and the second portion of the arm is coupled to a retaining assembly of the mounting device configured to retain the PEV, and wherein the first portion and the second portion are coupled to one another at a joint.

2. The apparatus of claim 1, wherein the base assembly of the mounting device comprises a first bar and a second bar perpendicularly bisecting the first bar, wherein each of the first bar and the second bar has a substantially square cross section such that a bottom surface of the base assembly is configured to lay flat on the floor of the transportation vehicle.

3. The apparatus of claim 1, wherein the base assembly of the mounting device comprises an adjustable locking mechanism configured to secure the mounting device to the floor of the transportation vehicle such that the mounting device is able to be adjustably secured on the floor at various locations.

4. The apparatus of claim 3, wherein the adjustable locking mechanism comprises adjustable locks, each received by a corresponding recess on the floor of the transportation vehicle.

5. The apparatus of claim 1, wherein the arm is configured to rotate in a first rotational direction to enable the mounting device to be transformed from a stowed position to a deployed position, wherein the first portion of the arm is configured to be oriented substantially perpendicular to the floor of the transportation vehicle in the deployed position.

6. The apparatus of claim 5, wherein the arm is configured to rotate in a second rotational direction to enable the mounting device to be transformed from the deployed position to the stowed position.

7. The apparatus of claim 1, wherein the first portion and the second portion of the arm are coupled to one another at an angle between about 90 degrees and about 180 degrees.

8. The apparatus of claim 1, wherein the first portion of the arm is pivotally coupled to the second portion of the arm at the joint.

9. The apparatus of claim 1, wherein the first portion of the arm is removably coupled to the second portion of the arm at the joint.

10. The apparatus of claim 1, wherein the retaining assembly of the mounting device is configured to retain the PEV at a portion of an elongated body of the PEV.

11. The apparatus of claim 10, wherein the retaining assembly of the mounting device is configured to retain the PEV via one or more fastener straps, each fastener strap being configured to loop around the portion of the elongated body of the PEV.

12. The apparatus of claim 1, wherein the arm of the mounting device comprises a biasing assembly configured to bias the retaining assembly toward the floor.

13. The apparatus of claim 12, wherein the biasing assembly is spring biased.

14. The apparatus of claim 1, wherein the mounting device comprises wedge members configured to retain a pair of wheels of the PEV, wherein the wedge members are coupled to an affixing feature of the arm of the mounting device via strings.

15. A transportation system for an amusement park, comprising:
    a transportation vehicle comprising a floor having a stationary rail and configured to carry passengers between locations associated with the amusement park; and
    a mounting device configured to retain a personal electric vehicle (PEV) on the floor of the transportation vehicle, wherein the mounting device comprises:
        a base assembly of the mounting device securing the mounting device to the floor of the transportation vehicle via the stationary rail;
        an arm of the mounting device including a first portion and a second portion, wherein the first portion of the arm is pivotally coupled to the base assembly via a hinge assembly, and the second portion of the arm is coupled to a retaining assembly of the mounting device configured to retain the PEV, and wherein the first portion and the second portion are coupled to one another at a joint.

16. The system of claim 15, wherein the first portion and the second portion of the arm are pivotally coupled to one another at the joint, wherein an angle between the first portion and the second portion of the arm is adjustable, and the angle approximately between 90 degree and 180 degree.

17. The apparatus of claim 15, wherein the first portion of the arm is permanently coupled to the second portion of the arm at the joint.

18. The apparatus of claim 15, wherein the arm is configured to rotate in a first rotational direction when the mounting device is transformed from a stowed position to a deployed position, and to rotate in a second rotational direction when the mounting device is transformed from the deployed position to the stowed position.

19. A method for retaining a personal electric vehicle (PEV) using a mounting device, comprising:
    rotating an arm of the mounting device in a first rotational direction to transform the mounting device from a stowed position to a deployed position in which the mounting device is configured to retain the PEV, wherein the arm of the mounting device comprises a first portion and a second portion, wherein the first portion is pivotally coupled to a base assembly of the mounting device via a hinge assembly enabling rotation, and the second portion is coupled to a retaining assembly of the mounting device configured to retain the PEV;
    positioning the PEV adjacent to the mounting device such that an elongated body of the PEV is adjacent the mounting device; and
    retaining the PEV via one or more fastener straps of the retaining assembly configured to loop around a portion of the elongated body of the PEV, wherein the elongated body of the PEV extends in a longitudinal direction from between a pair of wheels and to a handle of the PEV.

20. The method of claim 19, comprising retaining the pair of wheels of the PEV by wedge members, wherein the wedge members are coupled to an affixing feature of the arm of the mounting device via strings.

* * * * *